Dec. 23, 1941.  A. KUTSCHA  2,267,526

AUTOMOBILE TRUCK

Filed June 22, 1940  8 Sheets-Sheet 6

Inventor:
Alois Kutscha
By  Attorney

Dec. 23, 1941.   A. KUTSCHA   2,267,526
AUTOMOBILE TRUCK
Filed June 22, 1940    8 Sheets-Sheet 7

Inventor:
Alois Kutscha,
By
        Attorney

Dec. 23, 1941. A. KUTSCHA 2,267,526
AUTOMOBILE TRUCK
Filed June 22, 1940 8 Sheets-Sheet 8

Inventor:
Alois Kutscha
By Robert R. Bell
Attorney

Patented Dec. 23, 1941

2,267,526

UNITED STATES PATENT OFFICE 2,267,526

AUTOMOBILE TRUCK

Alois Kutscha, Chicago, Ill.

Application June 22, 1940, Serial No. 341,793

9 Claims. (Cl. 214—83)

My invention relates to improvements in automobile trucks and particularly in the bodies thereof, and the principal object of my invention is to provide body which can be emptied of its load of bulk material speedily, with ease, and into a receiving area arranged at the side of the rear of the truck and on a level with the bottom of the truck body or above or below such level.

Another object is to provide a truck body having an automatic unloading means whereby a predetermined amount of the bulk material may be unloaded without disturbing the balance of the material in the body.

A further object is to provide a truck body which will be simple, durable and reliable in construction and efficient in operation.

Other objects of my invention will appear hereinafter and will be obvious from the following description and drawings.

Referring to the drawings.

Figure 1:
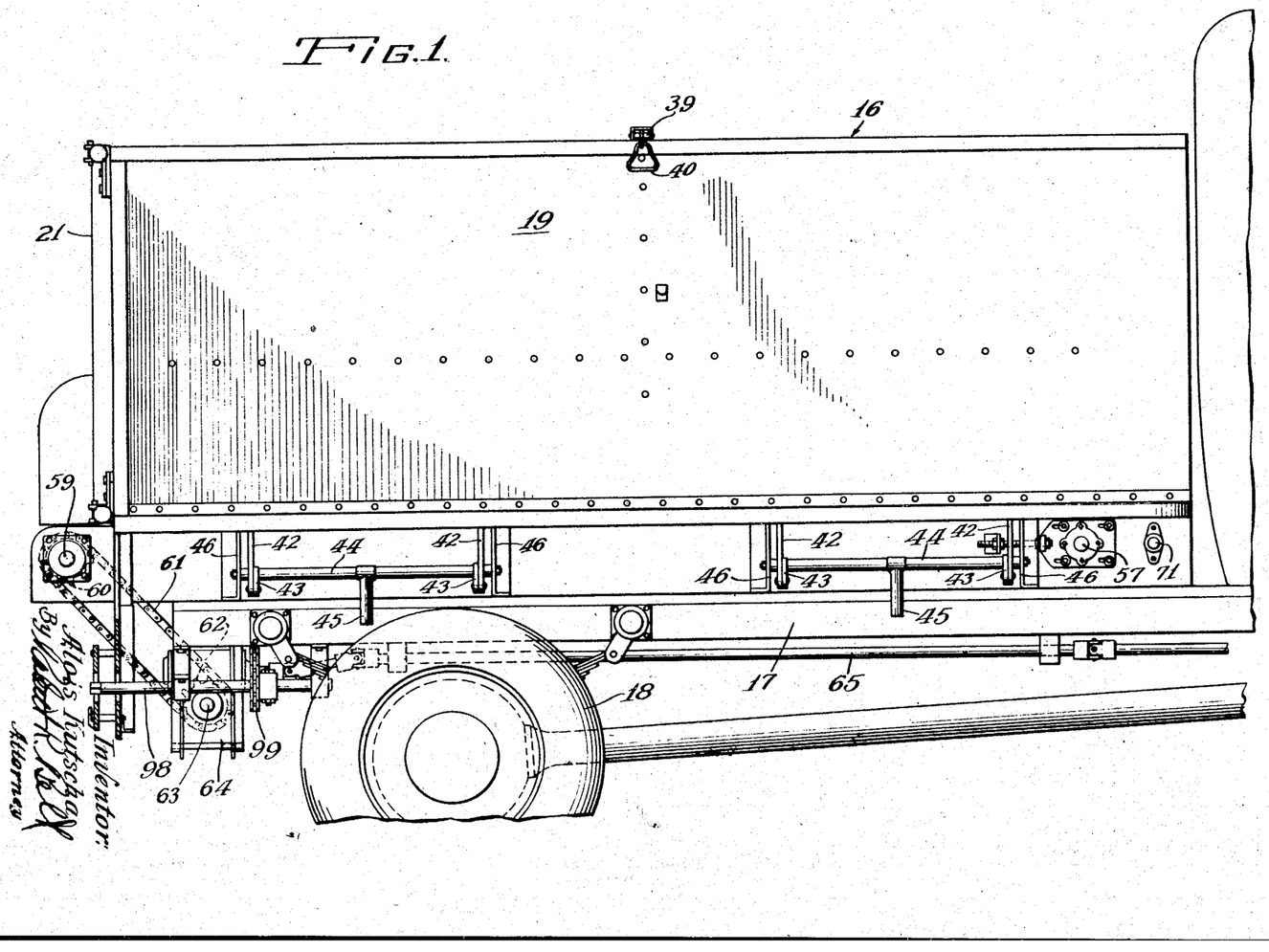
Fig. 1 is a side elevation of an embodiment of my truck body.
Figure 2:
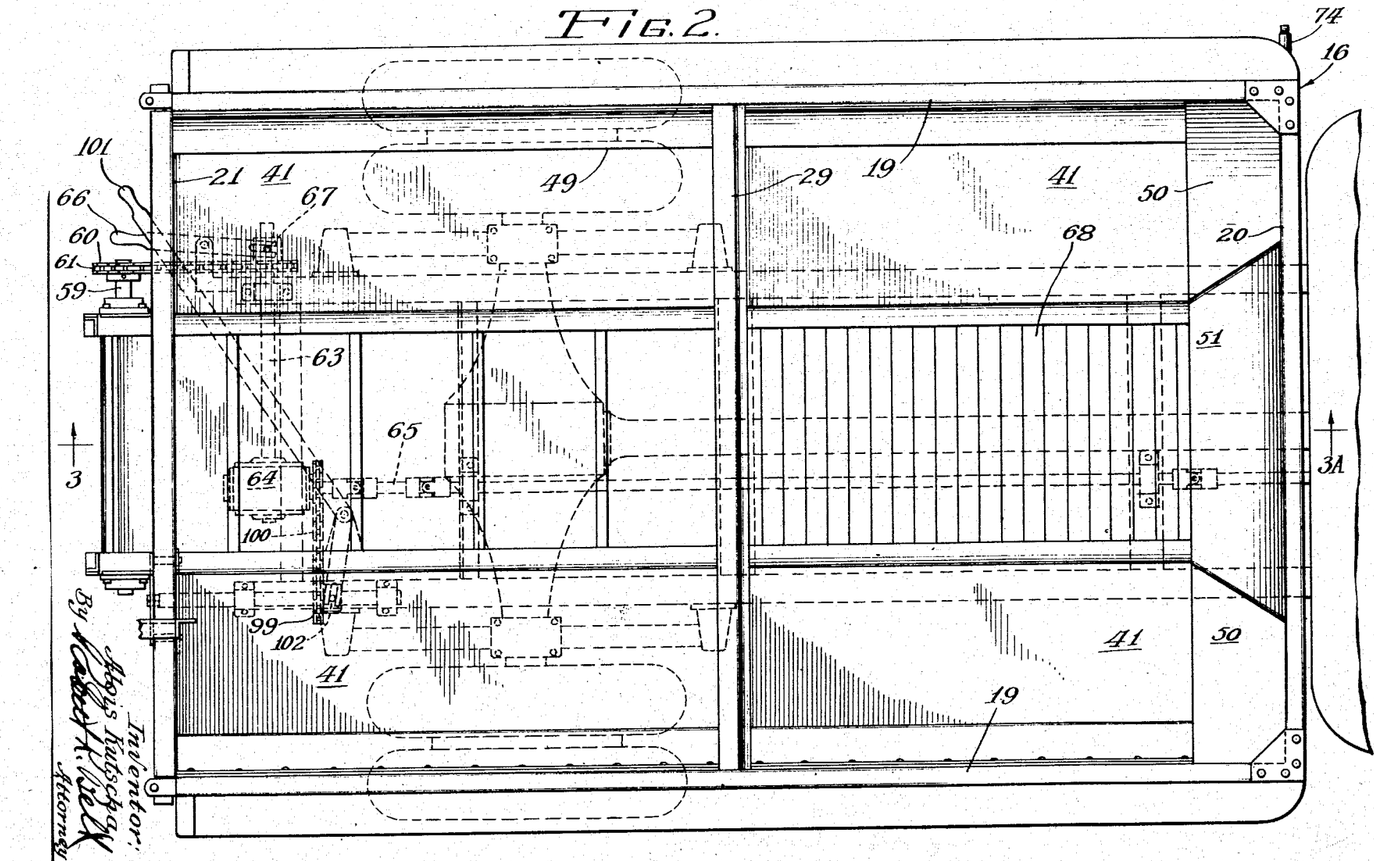
Fig. 2 is a top plan view of the body as shown in Fig. 1.
Figure 3:
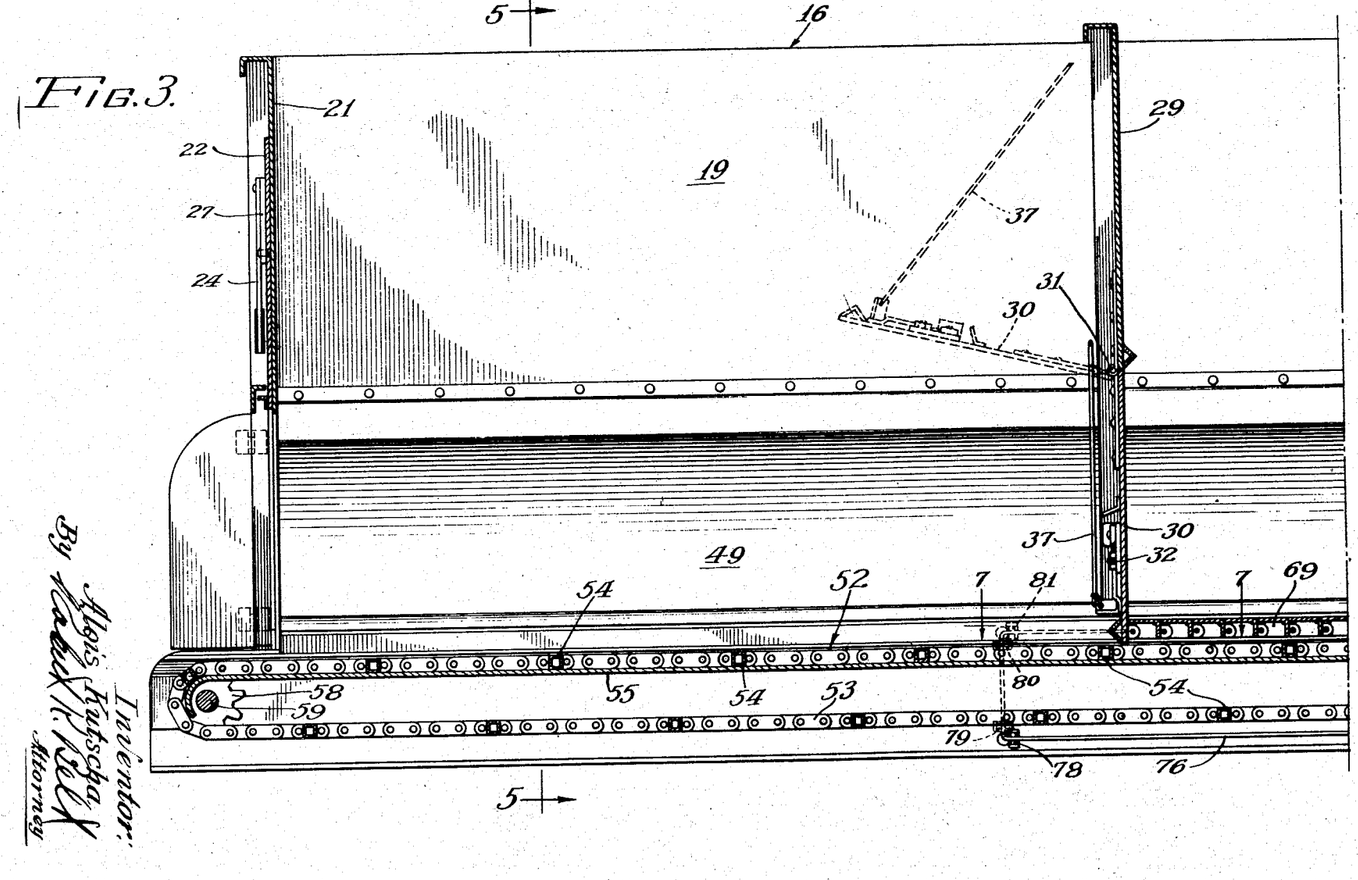
Figs. 3 and 3A are enlarged views which, taken together, comprise a sectional view on the line 3—3A on Fig. 2.
Figure 5:
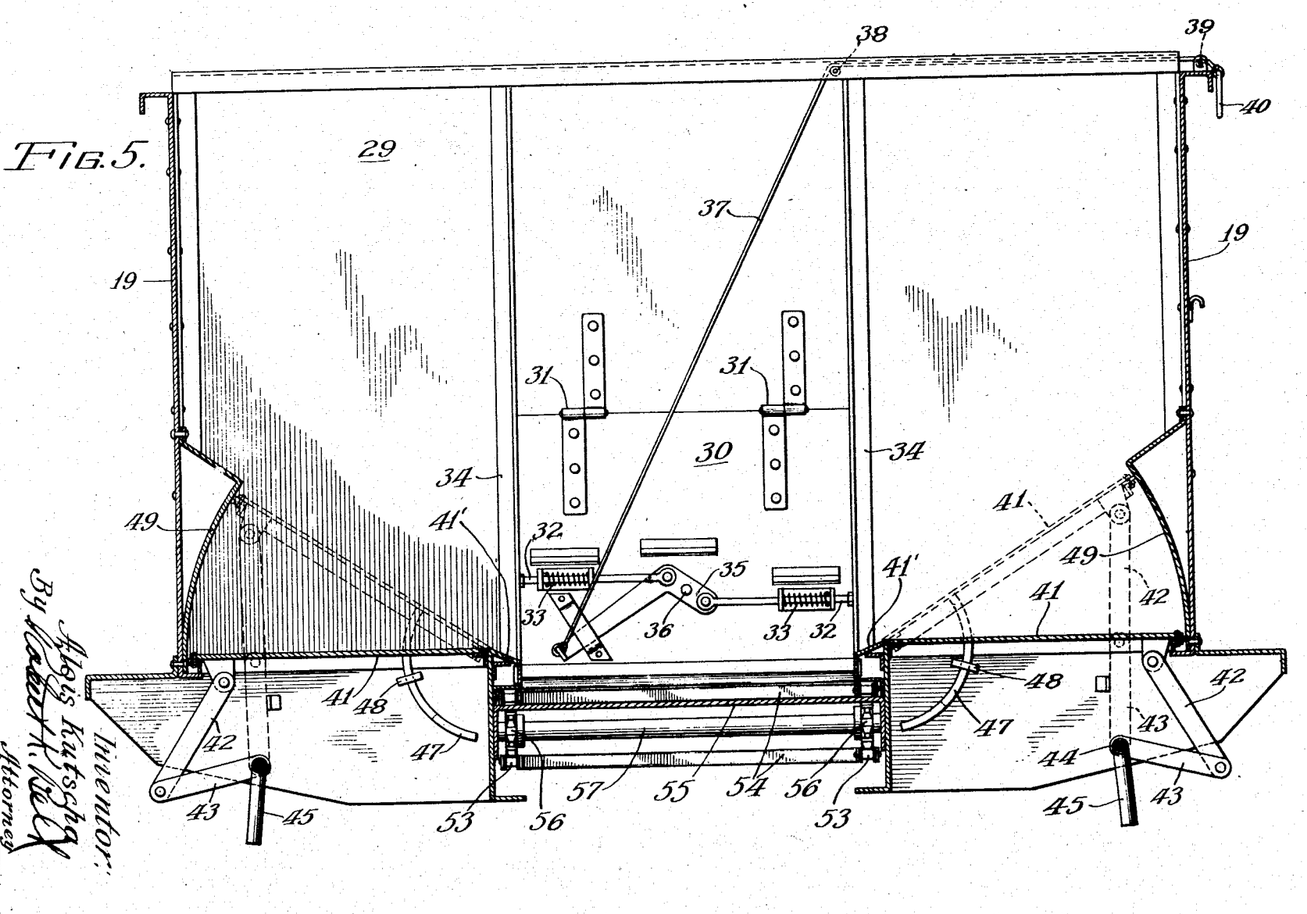
Fig. 5 is a sectional view taken on the line 5—5 on Fig. 3.

The truck body, generally indicated by 16, is mounted in the usual truck frame 17 substantially over the rear wheels 18 of the truck chassis. The truck body of my invention is primarily for the purpose of hauling such bulk material as coal, sand, gravel, crushed stone and the like. Consequently I have illustrated in the drawings solid panel sides 19 and a front end 20 and a rear end 21. The rear end 21 is provided with a discharging door 22, Fig. 9, mounted in suitable slides 23 to enable raising the door for unloading and lowering the door for loading and transporting the material. A suitable lever 21 is pivoted at 25 and is pivotally secured at 26 at one end to a link 27 secured to the door 22 by the pin 28. The door may easily be raised to open position, as shown in broken lines on Fig. 9, by pressure downwardly upon the handle of the lever 24. The unloading conveyor to be described hereinafter then will unload the desired amount of material from the truck body. An intermediate panel 29, Figs. 2, 3 and 5, is provided substantially midway of the longitudinal extent of the truck body, thus dividing the load into two distinct and substantially equal portions when the truck is full. If desired, however, the truck may be only half full and in such event the load will be disposed on one side or the other of the intermediate panel 29.

When the truck is unloaded, the compartment to the rear of the intermediate panel 29 is emptied first by the conveyor and the compartment forwardly of the panel 29 is then emptied. It is necessary to provide an opening in the panel 29 for unloading the material in the forward compartment. However, it is naturally to be desired that this opening be closed when emptying the rear compartment. Consequently a door 30 is provided in the intermediate panel 29 and is hinged thereto at 31. Suitable latch devices 32 are provided and are spring-pressed by springs 33 into suitable openings in angle irons 34 provided on the intermediate panel 29. The latch devices 32 are pivotally secured to a bell crank lever 35 pivoted at 36 to the door 30. A cable 37 is secured to one end of an arm of the bell crank 35 and passes over rollers 38 and 39 and terminates in a grasp ring 40. To open the door the operator will grasp the grasp ring 40, pulling on the cable and pivoting the bell crank on the pivot 36 to draw the latch devices 32 from the openings in the angle irons 34 to unlock the door, further pulling on the grasp ring 40 to raise the door about its hinges 31, thus permitting unloading of the material from the forward compartment.

Figure 4:
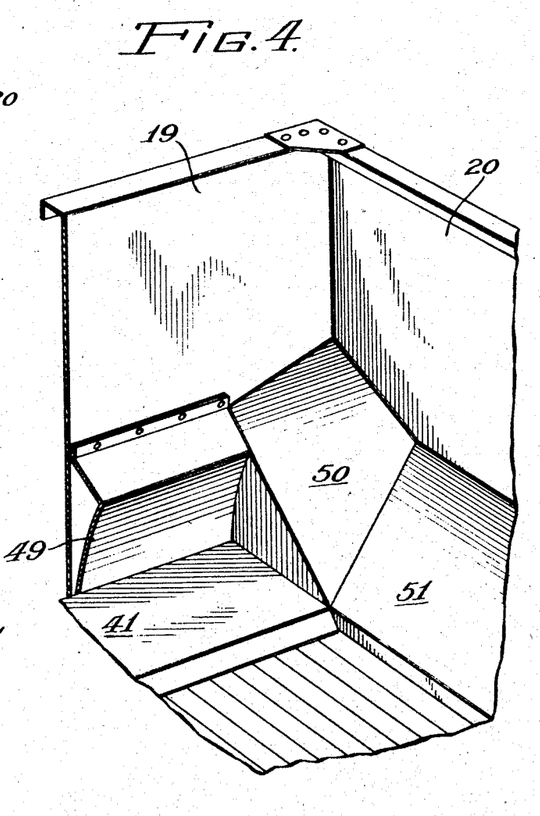
Fig. 4 is a fragmentary enlarged view of an inside front corner of the truck body.
Figures 5A, 12, 13, 14, 15:
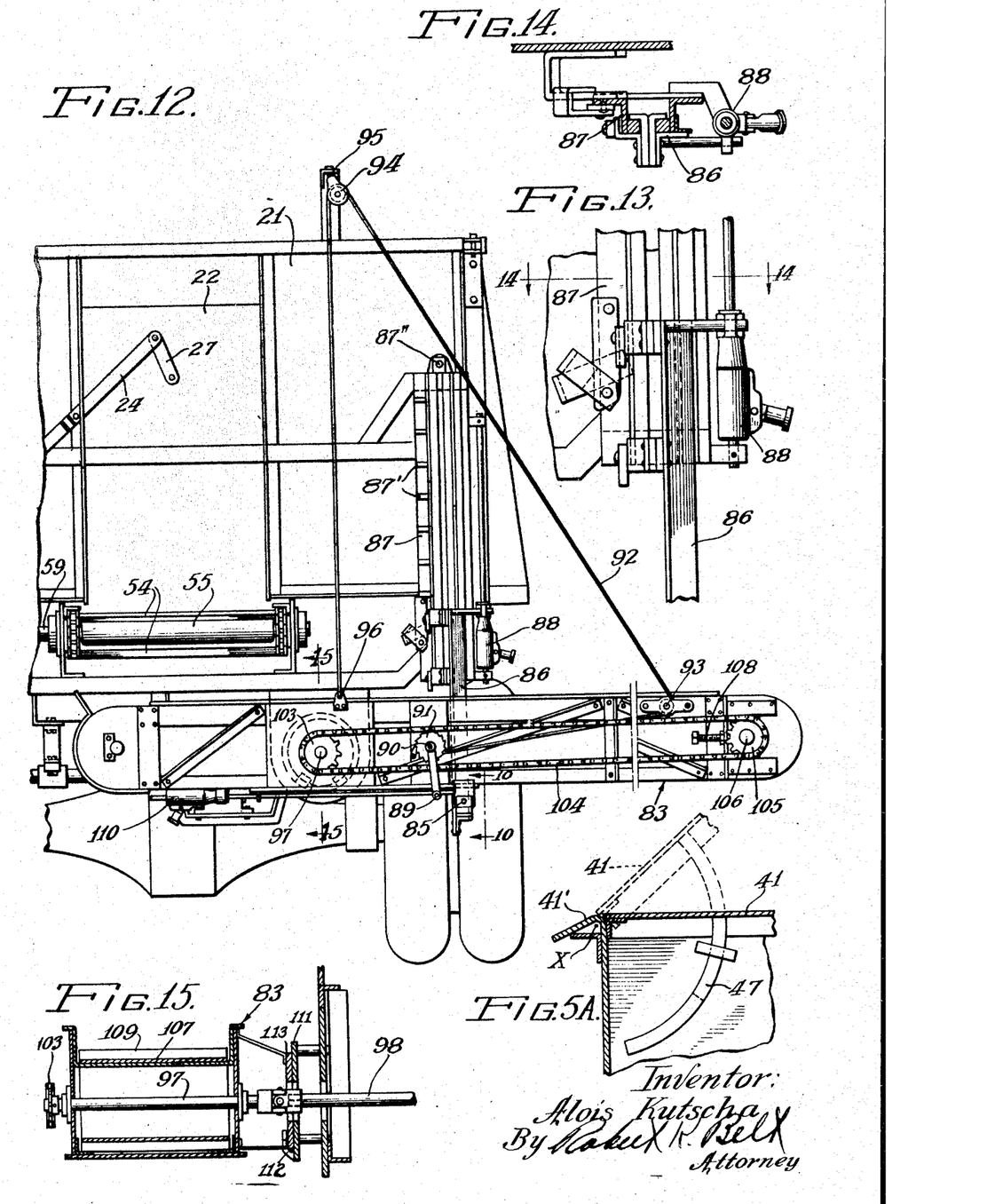
Fig. 5A is a detailed sectional view showing the hinge structure of the floor plates.
Fig. 12 is a fragmentary view similar to that of Fig. 9 but showing the discharging conveyor in lowered or discharging position.
Fig. 13 is an enlarged detail view of a part of the mechanism illustrated in Fig. 12.
Fig. 14 is a sectional view on the line 14—14 on Fig. 13.
Fig. 15 is a sectional view on the line 15—15 on Fig. 12.
Figure 6:
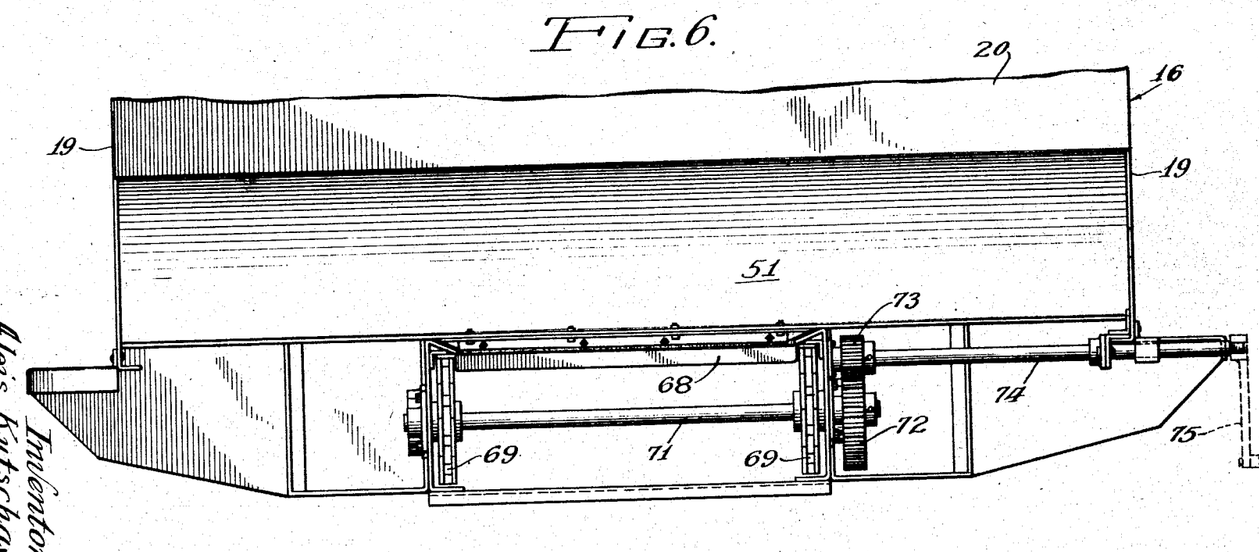
Fig. 6 is an enlarged end view of the unloading conveyor.

Inasmuch as the conveyor is of less width than the width of the body and is located substantially along the longitudinal center line thereof, It has been found that the material adjacent the conveyor will not be fully discharged from the truck by an operation of the conveyor. Hence I provide means for positively assuring discharge of the material on the sides of the conveyor, and this means is best illustrated in Figs. 4, 5 and 5A. The floor plates 41 are normally in flat horizontal position but they have secured thereto a link 42 pivotally engaging a lever 43 rigidly mounted on a shaft 44 to which a handle 45 is rigidly secured. The shaft 44 is mounted in angle irons 46 whereby raising of the handle 45 outwardly, as viewed in Fig. 5, will straighten the lever 43 and link 42 which is, in effect, a toggle mechanism, raising the outer side of the floor plates 41 to the angular broken line position illustrated. A suitable guide bar 47 is provided that travels through a guide 48 to hold the floor plates 41 whether in raised or lowered position and during the operation of raising and lowering the floor plates. The plates 41 are not secured to the permanently inclined plates 41', Fig. 5, but the plates 41 very slightly overlap the top edge of the vertical portion of the plates 41' to insure that there will be no opening at this point to allow the material, however fine, to drop through. The arc of the guide bar, the curvature of the bend between the inclined and vertical portions of the plates 41', and the arc of movement of the lower edge of the plates 41 have a common center indicated at X, so that the lower edge of the plates 41 will ride over and in contact with the curvature of the bend between the inclined and vertical portions of the plates 41' during movement of the plates 41 thus cleaning this joint and keeping material from dropping through. I further provide an arcuate baffle plate 49 on the side panels of the body which is on the same radius as that of the outer side of the floor plates thus insuring that no gap will be opened up when the floor plates are placed in raised or angular position. I likewise provide a plate 50, Fig. 4, at the front inside corners and a plate 51 at the front center of the body at an angle to enable material to slide downwardly thereon and onto the conveyor. If the material is of great weight and the leverage on the handle 45 is not sufficient a pipe or shaft with hollow ends may be slipped thereon by the operator to increase the leverage.

The unloading conveyor, generally indicated by 52, comprises a pair of endless chains 53 running longitudinally of the body at the center thereof. These chains are spaced by cleats 54 arranged therebetween. The cleats are adapted to ride on a plate 55 which forms part of the floor of the rear compartment and the chains 53 ride on sprockets 56 mounted on a shaft 57 at the forward end of the body. The chains are driven by sprocket 58 mounted on shaft 59 at the rear of the body, Figs. 2 and 9. A sprocket 60 is mounted on the end of the shaft 59 and a drive chain 61 passes thereabout and about a sprocket 62 mounted on a drive shaft 63 which passes into a gear box 64 which is connected to the power take-off of the truck motor by drive shaft mechanism 65. A suitable lever 66 is provided which operates a conventional clutch 67 to connect the sprocket 62 with the shaft 63 to effect driving operation of the unloading conveyor. The conveyor extends somewhat to the rear of the rear wall of the body as seen in Fig. 2 to facilitate the unloading.

Figure 3A:
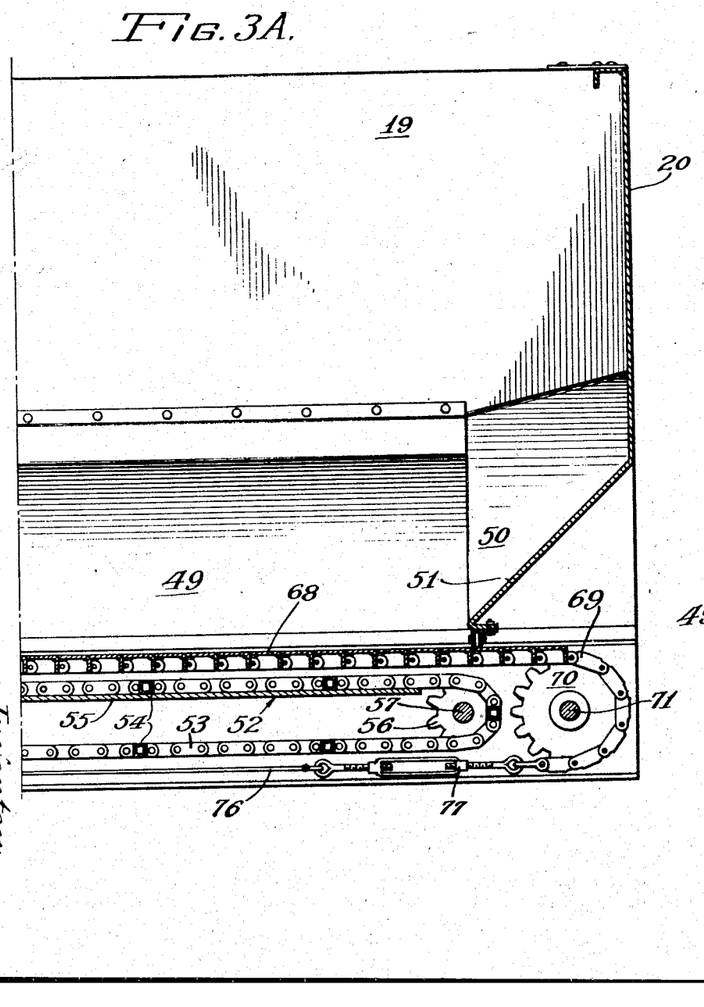
Figure 7:
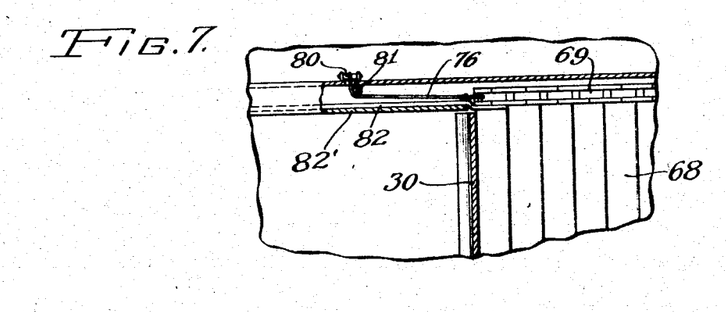
Figs. 7 and 8 are detail sectional views of a portion of the movable floor of the truck body.
Figure 8:
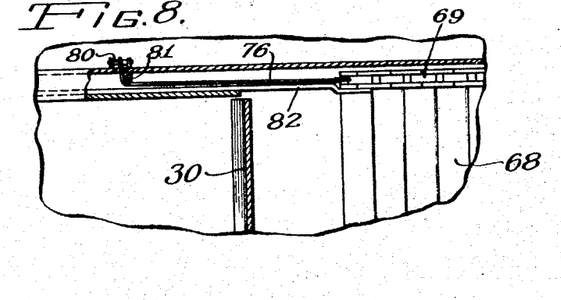

As has been mentioned heretofore, it is sometimes desirable to empty only half of the material from the truck but it will be noticed that the unloading conveyor reaches from the forward end of the body to beyond the rearward end and ordinarily the entire contents of the truck would be unloaded but, however, I have provided a movable floor 68 comprising a plurality of sections each of which is secured at its ends to chains 69, Fig. 3A, which pass about a sprocket 70 rigidly mounted on a shaft 71. The shaft 71 is provided at its outer end with a gear 72 which meshes with a gear 73 on a crank shaft 74 on which a crank 75 may be secured. The chain 69 is secured to a cable 76 by a turnbuckle 77 and the cable extends around rollers 78, Fig. 3, and through an opening in the truck frame and rollers 79 and 80 and thence inside the truck frame through an opening around a roller 81 and thence to the other end of the chain 69. Operation of the crank 75 rotates the shaft 71 and the sprockets thereon to move the sections of the movable floor 68 forwardly and down into the general position of the turnbuckle 77, thus exposing the unloading conveyor to the material in the forward compartment. When the rear compartment only is to be unloaded, the movable floor will, of course, remain in place until such time as the forward compartment is to be unloaded. A follower plate 82 is rigidly secured to the most rearward section of the movable floor, Figs. 7 and 8, which plate follows the sections when they are being moved forwardly to close off the passage in which the chains 69 and cable 76 ride, thus preventing the material from jamming the mechanism. Normally, however, the follower plates will be arranged behind permanent cover plates 82'.

Figure 9:
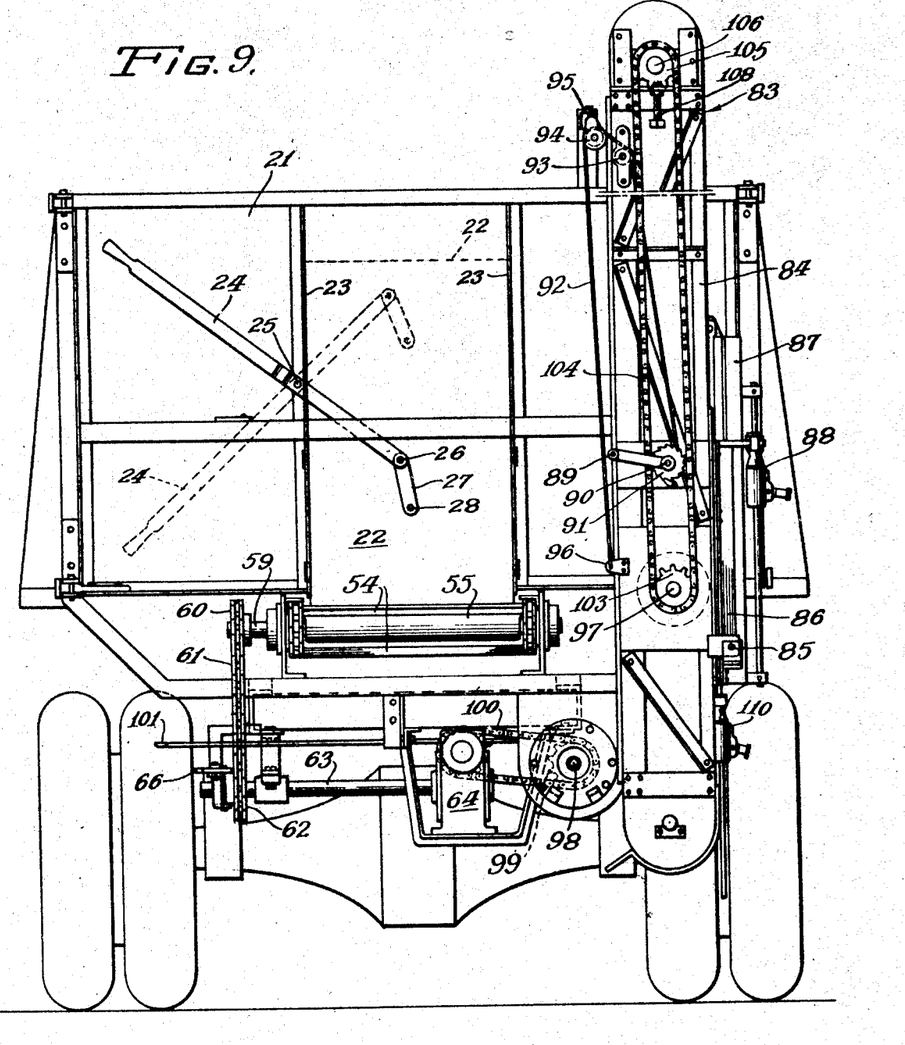
Fig. 9 is a rear end view of the truck body.
Figure 10:
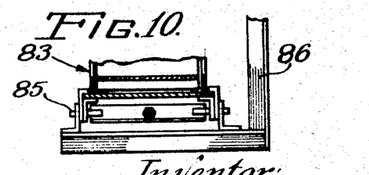
Fig. 10 is a detail sectional view on the line 10—10 on Fig. 12.
Figure 11:
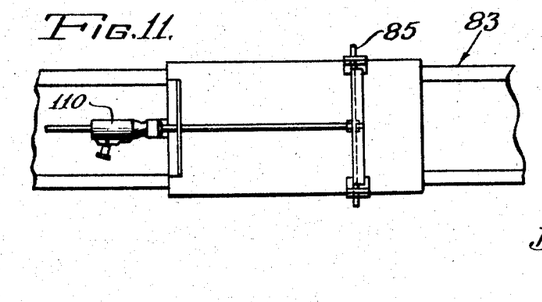
Fig. 11 is a detail bottom view showing the hinge member of the discharging conveyor.

I provide a discharging conveyor, generally indicated by 83, Figs. 9 and 12 and which is normally in the position illustrated in Fig. 9. The conveyor frame 84 is pivotally mounted at 85 to the bar 86. The bar 86 is slidably mounted in the support 87 pivoted at 87'' on the rear of the truck body and may be held in any of a number of vertical positions by the pawls 86' which are engageable with stop plates 87'. A hydraulic jack 88 may be provided which is secured to the bar 86 and enables lowering of the pivot 85 from the position shown in Fig. 9 to the position shown in Fig. 12. At the same time the pivot 85 is lowered the conveyor is swung manually about its pivot to its horizontal position. The swinging from vertical to horizontal position is controlled by the handle 89 on the ratchet shaft 90 on which the pawl and ratchet device 91 is secured. A cable 92 is likewise secured to the shaft 90 and passes over roller 93 near the outer end of the conveyor and over the roller 94 mounted on the support 95 on the truck body. The other end of the cable is secured to the bracket 96 on the other end portion of the conveyor frame. When the conveyor is swung into the horizontal position, the shaft 97 comes into engagement with the shaft 98 on which sprocket 99 is mounted and about which the chain 100 passes. The chain 100 passes about a sprocket mounted on the drive shaft 65 at the gear box 64. A suitable clutch handle 101, Fig. 2, is arranged to operate a clutch 102 on the shaft 98 to operatively secure the sprocket 99 to the shaft 98 for driving the discharging conveyor. The shaft 97 is provided with a sprocket 103 about which a chain 104 passes to and around a sprocket 105 mounted on a shaft 106 for driving the belt 107 of the discharging conveyor. The shaft 106 is provided with a suitable adjustment 108 for tightening the belt. The belt is also provided with suitable cleats 109 for assuring discharge of the material dumped on the belt by the discharging conveyor regardless of the angle of the discharging conveyor. A suitable jack device 110 is provided to adjust the position of the pivot 85 relative to the body of the conveyor so that the conveyor may be pivoted about the shaft 97 to a limited extent by the device including the cable 92 so that the discharging conveyor may elevate the material dumped thereon to pass it through a high window for example. A disc 111, Fig. 15, is rigidly mounted on the truck frame and is provided with a pair of hook-shaped lugs 112 in the lower part thereof to receive a disc 113 on the conveyor 83. The discs 111 and 113 have an opening at their centers in which the connection between shafts 97 and 98 is made. This structure provides alignment of the shafts in the pivotal movement of the conveyor 83 about the shaft 97 previously described.

While I have illustrated and described a selected embodiment of my invention it is to be understood that this is capable of variation and modification and I therefore do not wish to be limited to the precise details set forth but desire to avail myself of such changes and alterations as fall within the scope of the following claims.

I claim:

1. In a truck body having side walls, a forward wall and a rear wall, an intermediate wall dividing the body into compartments, conveyor mechanism in the floor of said body, a door in said intermediate wall, a conveyor extending beneath both of said compartments, a slidable floor in said forward compartment and normally arranged over said conveyor whereby said rear compartment may be unloaded without disturbing the contents of the forward compartment and means for sliding said slidable floor from over said conveyor and from under the load in the forward compartment to permit unloading of the forward compartment.

2. In a truck body having side walls, a forward wall and a rear wall, an intermediate wall dividing the body into forward and rear compartments, a door in said intermediate wall, means for opening said door when said forward compartment is to be emptied, a conveyor mechanism in the floor of said truck body extending from the front to the rear thereof and operable by the truck motor for discharging the contents of said body, and a movable floor over that part of the conveyor arranged in the forward compartment and adapted to receive the material to be placed in said forward compartment whereby the material in said rear compartment may be unloaded by said conveyor without disturbing the material in said forward compartment.

3. In a truck body having side walls, a forward wall and a rear wall, an intermediate wall dividing the body into forward and rear compartments, a door in said intermediate wall, means for opening said door when said rear compartment is to be emptied, a conveyor mechanism in the floor of said truck body extending from the front to the rear thereof and operable by the truck motor for discharging the contents of said body, a movable floor over that part of the conveyor arranged in the forward compartment and normally adapted to receive the material to be placed in said forward compartment whereby the material in said rear compartment may be unloaded by said conveyor without disturbing the material in said forward compartment, and means for moving said floor from over said conveyor whereby said conveyor will unload the material in said forward compartment.

4. In a truck body having side walls, a forward wall and a rear wall, an intermediate wall dividing the body into forward and rear compartments, a door in said intermediate wall, means for opening said door when said rear compartment is to be emptied, a conveyor mechanism in the floor of said truck comprising a pair of endless chains spaced apart and extending from front to rear of said truck body and operable by the truck motor for discharging the contents of said body, a movable floor over that part of the conveyor arranged in the forward compartment and normally adapted to receive the material to be placed in said forward compartment, means for moving said floor from over said conveyor whereby said conveyor will unload the material in said forward compartment, and means adapted to cover said chains as said movable floor is being moved from over said conveyor whereby material is prevented from dropping out of said body onto said chains.

5. In a truck body having side walls, a forward wall and a rear wall, conveyor mechanism arranged in the central portion of said body and extending longitudinally thereof, tiltable floor sections adjacent and slightly above the sides of said conveyor mechanism, plates including an inclined portion arranged between said conveyor mechanism and said tiltable floor sections and bent at their juncture with said tiltable floor sections upon a radius to provide vertical portions of said plates, and means for tilting said floor sections so that the end thereof adjacent the bend of said plates will move on the same radius as said bend to provide a self-cleaning juncture between said plates and said floor sections and prevent material from falling therethrough.

6. In a truck body having side walls, a forward wall and a rear wall, conveyor mechanism arranged in the central portion of said body and extending longitudinally thereof, tiltable floor sections adjacent and slightly above the sides of said conveyor mechanism, plates including an inclined portion arranged between said conveyor mechanism and said tiltable floor sections and bent at their juncture with said tiltable floor sections upon a radius to provide vertical portions of said plates, guide bars secured to said floor sections and arranged in an arc having as its center the same center as the bend of said plates, a guide for said guide bar, and means for tilting said floor sections so that the end thereof adjacent the bend of said plates will be guided by said guide and guide bar to move on the same radius as said bend to provide a self-cleaning juncture between said plates and said floor sections and prevent material from falling therethrough.

7. In a truck body having means therein for automatically unloading the contents thereof at the rear of said body, conveyor means comprising a conveyor frame, an endless belt, said frame pivotally secured to the rear of said body and normally arranged in vertical position, means for adjusting said conveyor longitudinally to enable insertion of said conveyor into and through an opening within which the load is to be discharged, and a jack for vertically adjusting said pivot to enable said conveyor means to be swung to extend under said unloading means to receive the material unloaded from said body when said conveyor frame is in horizontal position.

8. In a truck body having means therein for automatically unloading the contents thereof at the rear of said body, conveyor means comprising a conveyor frame, an endless belt, said frame pivotally secured to the rear of said body and normally arranged in vertical position, a jack for vertically adjusting said pivot to enable said belt to extend under said unloading means to receive the material unloaded from said body when said conveyor frame is in horizontal position, and another jack for adjusting said conveyor frame relative to said pivot to permit adjustment of the conveyor at an angle to the horizontal for discharging the material placed thereon by the unloading means at a point higher than the floor of the truck body.

9. In a truck body having means therein for automatically unloading the contents thereof at the rear of said body, a support pivotally mounted on the rear of said truck body, a slide carried by said support, conveyor means comprising a conveyor frame pivotally mounted on said slide, said frame pivotally secured to said slide and normally arranged in vertical position, said slide being vertically adjustable to enable one end of said conveyor to extend under said unloading means when in horizontal position to receive the material unloaded from said body, means for adjusting said conveyor frame relative to said pivotal mounting on said slide to permit adjustment of the conveyor at an angle to the horizontal for discharging the material placed thereon by the unloading means at a point higher than the floor of the truck body, and means for holding said conveyor at one of a predetermined plurality of angles.

ALOIS KUTSCHA.